Figure 5:
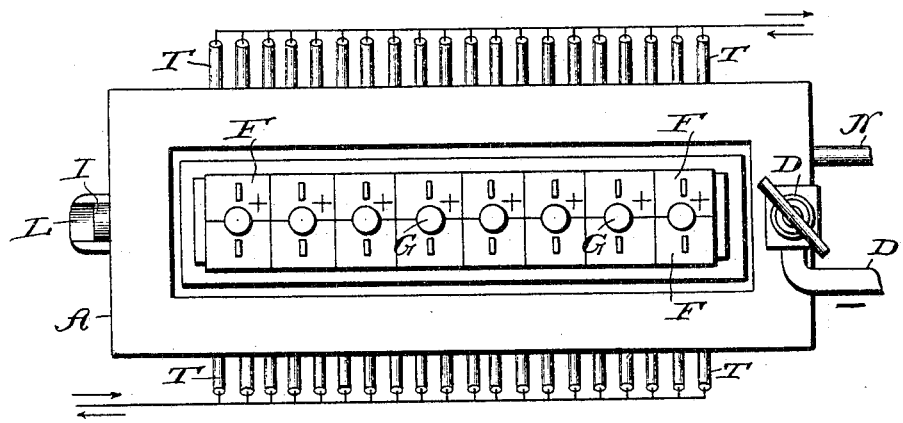

No. 775,060. PATENTED NOV. 15, 1904.
H. S. BLACKMORE.
PROCESS OF REDUCING ALUMINIUM OR OTHER METALS.
APPLICATION FILED AUG. 22, 1904.
NO MODEL. 2 SHEETS—SHEET 1.
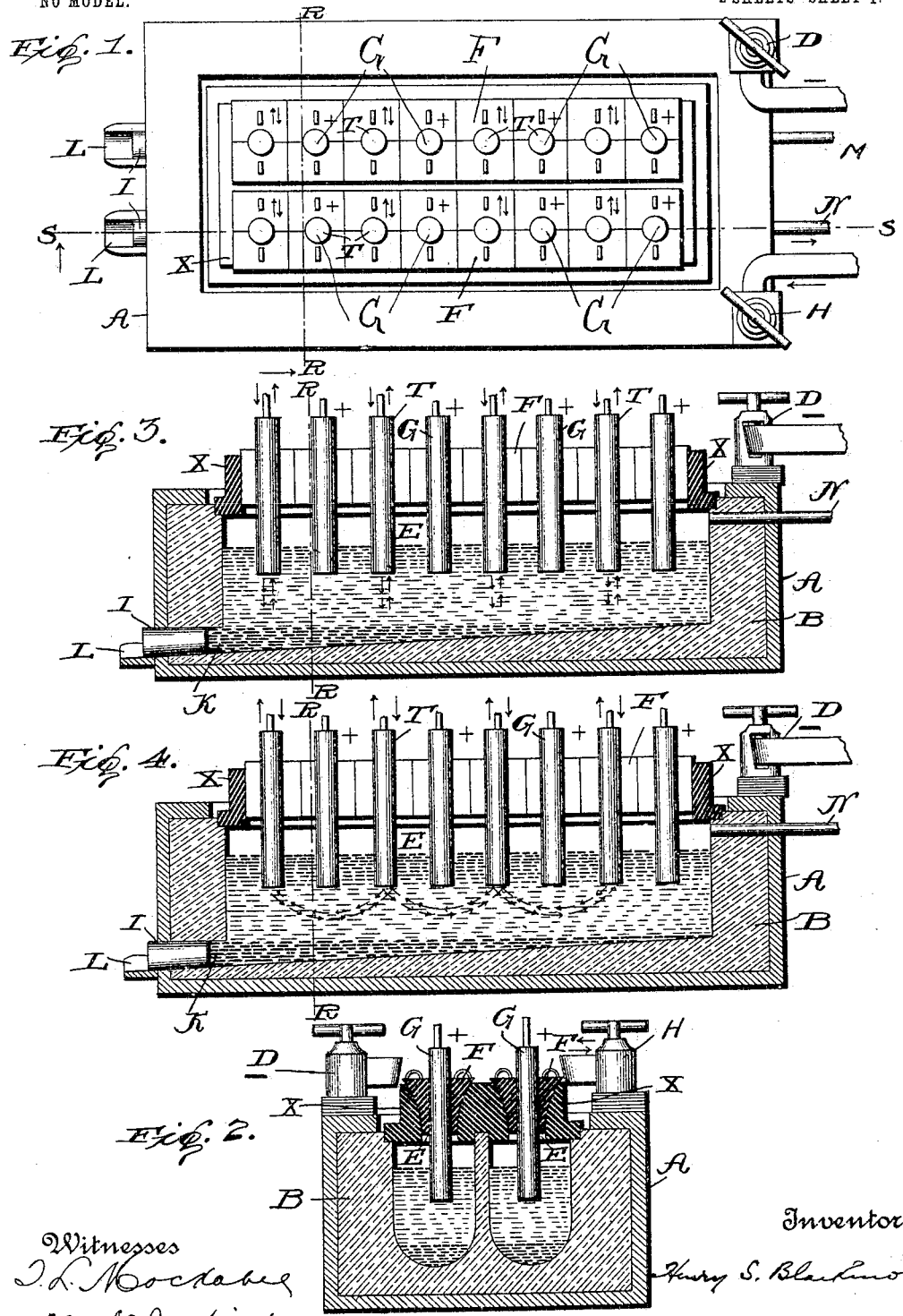

No. 775,060. PATENTED NOV. 15, 1904.
H. S. BLACKMORE.
PROCESS OF REDUCING ALUMINIUM OR OTHER METALS.
APPLICATION FILED AUG. 22, 1904.
NO MODEL. 2 SHEETS—SHEET 2.

Witnesses
T. L. Mockabee
H. N. Jenkins

Inventor
Henry S. Blackmore

No. 775,060.  
Patented November 15, 1904.

UNITED STATES PATENT OFFICE.

HENRY SPENCER BLACKMORE, OF MOUNT VERNON, NEW YORK.

PROCESS OF REDUCING ALUMINIUM OR OTHER METALS.

SPECIFICATION forming part of Letters Patent No. 775,060, dated November 15, 1904.

Application filed August 22, 1904. Serial No. 221,748. (No specimens.)

*To all whom it may concern:*

Be it known that I, HENRY SPENCER BLACKMORE, a citizen of the United States, residing at Mount Vernon, in the county of Westchester and State of New York, have invented new and useful Improvements in Processes of Reducing Aluminium or other Metals and Making Alloys Thereof, of which the following is a specification.

The object of my invention is to reduce metals from their oxids in a rapid, efficient, and economical manner; and it consists, essentially, in liquefying metal oxid by the action of molten oxids of more electropositive metals with reference to oxygen, subjecting such metal oxid thus liquefied below its normal melting-point to the action of an electrolytic current capable of dissociating it with or without the employment of electrodes capable of uniting with the electronegative constituents evolved.

My invention relates particularly to the reduction of aluminium from its oxid, but is not confined to the reduction thereof, as it may be applied to the reduction of many other metals.

Many attempts have been made to reduce aluminium oxid by heating it with reducing agents, such as carbon; but it has been found that a large amount of heat is required in order to perform the reduction and that the temperature is then so high that it volatilizes the metal reduced. Attempts have also been made to fuse aluminium oxid *per se* and dissociate it by electrolysis. The high fusing-point, however, has precluded the use of this process on a commercial basis, because of the large expenditure of electric current required and the volatilization or combination of the reduced metal with the reducing agent with which it is associated, such as carbon, at the high temperature necessary to perform the reduction, which occasions great loss of metal. It has also been proposed to dissolve aluminium oxid or liquefy it by the action of molten chemicals, such as the fluorids of aluminium, together with fluorids of more electropositive metals with reference to fluorin—such as sodium, potassium, &c.—and then dissociate or decompose the liquefied aluminium oxid by the action of an electric current. It is found, however, in the operation of this process that a considerable amount of electric power is required to maintain the fluorid solvent composition in a state of fusion wherein the aluminium oxid is liquefied and finally electrolyzed and also that the aluminium reduced is liable to be contaminated with sodium or potassium, which largely destroys its commercial value. It has further been proposed to fuse metal oxids by the direct action of an electric current and then after fusion to dissociate or electrolyze it by increasing the amount of current above that necessary to fuse the substance to a degree sufficient to perform its electrolysis.

In order to overcome the difficulties experienced in the prior art, I have devised means whereby the electrolysis or electrolytic dissociation of metal oxids such as aluminium oxid may be conveniently and economically carried on by employing as a solvent medium for the more refractory metal oxids a compound or composition of readily-fusible metal oxid or oxids which metal or metals have greater affinity for oxygen than has the metal desired to be reduced and then subjecting the more fusible oxid containing the metal oxid to be reduced which has been liquefied thereby to the action of an electrolytic current capable of dissociating the compound of or liberating the metal desired without decomposing the solvent metal-oxid bath consisting of metal having greater affinity for oxygen. By employing oxids of metals having greater affinity for oxygen than the metal desired less electric power is required to fuse and maintain fusion of the solvent bath than is necessary to fuse and maintain fusion of a solvent bath of metal fluorids as employed in the prior art. The metal oxid to be reduced is more solvent in a bath of fusible metal oxid than in the fluorid bath, and therefore admits of the production of a larger yield of metal in shorter time from a bath of smaller compass and also economizes the amount of heat necessary to maintain the larger masses of fluorids in the fused condition to perform the same operation.

In carrying out my invention for the reduction of aluminium I take oxids of lithium and calcium in proportion of about four of the former to one of the latter and fuse the same by any economical means, such as heat externally applied or preferably by the passage of an alternating electric current through the same between electrodes, the said alternating current being of such character that it will not yield metal from the substances fused thereby. Then after fusion I add to the bath aluminium oxid, which readily dissolves therein, and simultaneously subject such dissolved aluminium oxid which has been liquefied below its normal melting-point by the action of the associated solvent substances to the action of a current of electricity capable of electrolyzing the liquefied aluminium oxid and yielding or liberating the aluminium therefrom.

It should be noted that the solvent bath of metal oxids employed in the reduction of metals must consist of oxids of metals which have a greater affinity for oxygen than does the metal desired to be reduced, the principal metals having greater affinity for oxygen than aluminium being lithium, calcium, and magnesium. I prefer, however, to form the solvent bath for the reduction of aluminium oxid of a mixture or combination of lithium and calcium oxid, as before stated, for the reason that the lithium oxid reduces the density or specific gravity of the calcium oxid, as well as its melting-point, and allows the aluminium liberated within its mass by the decomposition of aluminium oxid to readily settle to the bottom thereof, so that it can be withdrawn from time to time as desired without fear of loss by oxidation, which would result should the metal remain suspended within a more dense molten material for any length of time, whereby it might reach the surface through circulation and burn in the presence of the oxygen of the air and also prevents final loss of metal which might otherwise remain mixed with the fluxes on cooling.

Lithium oxid or calcium oxid may be employed *per se* as a solvent bath; but I prefer the mixture as aforesaid for the reasons noted.

In carrying out my process for the production of aluminium I prefer to employ an apparatus as illustrated in the accompanying drawings, in which—

Figure 1 is a plan or top view. Fig. 2 is a vertical section on the line R R, Fig. 1. Fig. 3 is a longitudinal vertical section on the line S S, Fig. 1. Figs. 4, 5, 6, and 7 illustrate various means of applying an alternating current to the solvent chemical bath of oxids for the purpose of melting the same.

In referring to the figures aforementioned the letter A designates a box or receptacle, preferably of iron, lined with a substance, such as carbon B, in such a manner as to form a receptacle for the substances to be reduced and solvent chemical bath therefor, in which is an electric conductor and a resistant, preferably of fusible nature, such as aluminium and lithium and calcium oxids in proportion of about four of the former to one of the latter and communicating with the electrodes. The material, such as the mixture of lithium and calcium oxids, as before stated, is introduced in the apparatus through the openings E, which are closed by the insulating covers or plugs F passing in the insulating-cover X, through which passes the electrodes G and T, which electrodes preferably consist of or contain carbon. The box or receptacle A is connected as cathode, while the electrodes G are connected as anode, when employing a direct current in an electric circuit for electrolyzing or dissociating aluminium oxid. In starting the apparatus I pass through the alternate carbon rods or electrodes T and the carbon lining of the box A an alternating electric current of such character that it will not yield metal from the substances employed and start an arc between the said electrodes T and the inside of the receptacle of the carbon-lined box A by separating the said electrodes T slightly from contact with the carbon lining of the receptacle and then feed in lithium and calcium oxids, which quickly become fused and accumulates in the carbon-lined receptacle, communicating with the electrodes T, through which after fusion the current of electricity passes as the electrodes are separated farther and farther from the interior of the carbon-lined receptacle and through which between the electrodes the alternating current passes, producing heat enough to fuse and maintain fusion of the solvent chemical bath without decomposition. When the solvent bath has become suitably fused, I introduce from time to time into the solvent chemical bath through the openings E by removing the insulated covers or plugs F aluminium oxid, which almost immediately becomes liquified by the action of the solvent bath. As the aluminium oxid becomes liquefied by the action of the chemical solvent bath I pass through the molten bath a direct or electrolytic current of electricity between the anodes G and the carbon walls of the receptacle A, which constitutes the cathode. By this procedure I am enabled to maintain a fluid condition of the solvent bath at a temperature below the normal melting-point of aluminium oxid by the action of an alternating current incapable of yielding metal from the substances employed, while the whole of the direct current may be utilized for electrolytic purposes in dissociating or electrolyzing the aluminium oxid which has been liquefied by the action of the chemical bath below its normal melting-point. The great advantage gained by such operation will be seen when the cheapness with which an alternating current may be produced, transmitted, and employed for heating purposes as compared with the more expensive direct current, which more expensive current may be wholly employed for the purpose of electrolytic dissociation in the liberation of aluminium without loss. By employing this system of reducing aluminium from its oxid I not only economize the cost of reduction by substituting the less expensive alternating current for fusion purposes instead of the more expensive direct current, as employed in the prior art, but I also gain a further advantage in that the solvent composition—namely, lithium and calcium oxids—are fusible with the expenditure of less energy than that required to maintain the fusion of the more expensive and more resistant fluorid compositions employed hereto, with the still further advantage that the solvent action of the molten oxid bath is more than threefold that of the fluorid bath, whereby the volume of solvent to liquefy a given quantity of aluminium oxid is largely reduced, with the still further advantage of saving energy which would be required in processes requiring maintenance of larger bodies of the more expensive fluorid solvent in a state of fusion during the process of reduction. The aluminium or metal reduced is withdrawn from time to time, as desired, through the tap-hole K and trough L by removing the plug I, the gaseous by-products escaping through the conduits M N. Instead of fusing the chemical solvent bath by passing an alternating current from the lining of the furnace B to and from the alternate electrodes T through the molten bath, as described and illustrated in connection with Fig. 2, I can alternately connect the electrodes T as alternating electric electrodes by disconnecting the alternating-current contact from the furnace-lining B and making each alternate electrode T constitute the direct terminus, communicating with the opposite poles of the alternating-current generator in such a manner that the alternating current will pass from and to the alternate electrodes T through the bath under the electrodes G, by which electrodes G a direct current is passed through the molten bath from the furnace-lining, which constitutes the cathode, as shown in Fig. 4, the direction of the alternating, heating, and non-metal-yielding current being indicated by small arrows passing through the bath between the alternate electrodes T. In this figure similar letters of reference constitute corresponding parts as shown in Figs. 1, 2, and 3, before described, this figure being intended merely to illustrate another manner of fusing the substances in the furnace by passing an alternating or non-metal-yielding current through the bath between electrodes independent of and insulated from the furnace and furnace-lining.

When fusing the solvent bath by passing an alternating or non-metal-yielding current through the same between the furnace-lining and electrodes T, the furnace is placed in electrical connection with the alternating current through the binding-post or clamp H, while the electrodes T communicate with the opposite side of the alternating-current generator, as shown in Figs. 1, 2, and 3, this connection at H, however, being dispensed with when employing the system illustrated in Figs. 4, 5, 6, and 7. The electrolysis of the metal oxid liquefied by the action of the solvent chemical bath is performed by connecting the furnace in a direct-current circuit as cathode through the binding-post D, the electrodes G communicating with the opposite pole of the direct-current generator and constituting the anodes during the passage of the current and electrolysis of the metal compound. The electrodes T and G are brought in communication with their various electric generators through metal rods connecting therewith attached to bus-bars by means of suitable clamps or other means. (Not shown.) The electrodes communicating with the fused substances consist, preferably, of carbon, which carbon electrodes when existing as anodes during electrolysis combine with the oxygen evolved in contact with the same, passing off as gaseous carbonic oxid through the exit-pipes or conduits M N.

Figure 6:
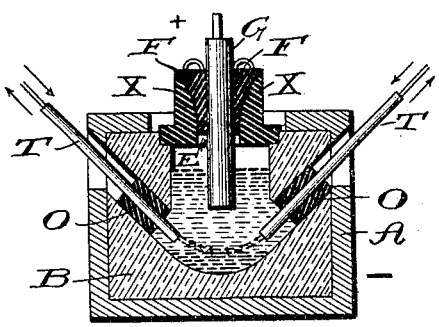
Figure 7:
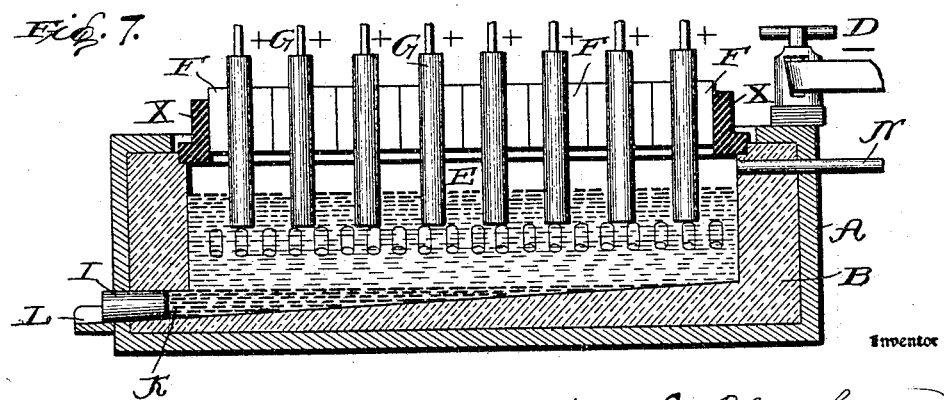

In Figs. 5, 6, and 7 I have illustrated another means whereby the substances are maintained in a molten condition by passing therethrough an alternating or non-metal-yielding current of electricity between the electrodes T independent of and insulated from the furnace by the insulation O. By the means here illustrated all of the vertical carbon electrodes G may be connected as anode in the circuit of the direct current, thereby admitting of a larger electrolytic yield. In these figures—namely, 5, 6, and 7—similar letters of reference constitute corresponding parts with those of Figs. 1, 2, 3, and 4.

I am aware that aluminates of metals having less affinity for oxygen than aluminium, such as sodium and potassium aluminates *per se*, have been dissociated by electrolysis; but it is found in these cases that the sodium or potassium is first liberated on account of its less affinity for oxygen than aluminium under these existing conditions, leaving as a residue a difficultly-fusible aluminium oxid unreduced to metallic aluminium, which residue is only reducible at exceedingly high temperatures by the action of carbon causing loss of aluminium by volatilization or combination with carbon, forming aluminium carbid. I am also aware that aluminates have been mixed with carbon and heated to a high degree; but in these cases unless the carbon is in great excess it separates from the mass when the aluminate fuses and floats on top thereof, or in case it is in excess it forms aluminium carbid, thereby rendering the process inoperative to produce commercial results.

When lithium and calcium oxids are fused together to form my preferable solvent bath for aluminium oxid, as hereinbefore described, they appear to combine to form a solvent bath which dissolves aluminium oxid without formation of aluminates; but should aluminates by any means be formed they are only transient products in the cycle of reduction dissolved in the fused bath of oxids of metals having greater affinity for oxygen than aluminium. A further new and novel feature of the process is therefore seen which is not revealed by prior art.

By adding copper oxid with aluminium oxid or copper aluminate to the solvent oxy bath copper-aluminium alloys may be produced by electrolysis, or by adding aluminates of other metals or mixtures of other oxids of metals having less affinity for oxygen than aluminium other aluminium alloys may be produced. I can also employ instead of aluminium oxid or a composition thereof with other metals having less affinity for oxygen for producing aluminium or alloys thereof the oxid or oxids of other metals desired so long as their reduction is performed in a bath of fusible solvent oxids having greater affinity for oxygen than the metal or metals the alloy of which is desired.

My invention, specifically stated, therefore consists in exposing a molten body of metal oxids to the action of an electrolytic current capable of selectively separating one or more of the metals therefrom without reducing the metal having greater affinity for oxygen while replenishing the bath from time to time with an oxy compound of the metal or metals having less affinity for oxygen as the metal is separated, the solvent bath in which the electrolysis of the metals is performed consisting of fused oxy compounds of metals having greater affinity for oxygen than the metal or metals desired.

It has nowhere in prior art been anticipated to form a solvent bath for aluminium oxid by fusing an oxid or oxids of metals having greater affinity for oxygen than aluminium and then liquefy aluminium oxid below its normal melting-point by adding it to the fused oxid bath and subjecting the aluminium oxid thus dissolved to the action of a direct current of electricity capable of yielding or liberating the aluminium by electrolysis, whereby the aluminium oxid may be reduced continuously by supplying it from time to time to the fused-oxid-solvent bath as increments are reduced to metallic aluminium as performed by my process. By maintaining a relatively low voltage of the direct or electrolytic current aluminium oxid may be readily dissociated, liberating aluminium without deteriorating or decomposing the solvent oxid bath, because of the greater affinity of the metals of the solvent bath for oxygen.

A further important and novel feature of my process is that I fuse and maintain fusion of the solvent chemical bath by the action of an alternating electric current incapable of yielding metal passed through the same between electrodes and reduce metal from the oxy compound contained in the fused bath by action of a direct electric current capable of yielding metal therefrom.

It will be noted that when I employ carbon anodes in the reduction of metal oxid dissolved or suspended in a bath of molten oxy compounds of metal having greater affinity for oxygen that the carbon is submerged and maintained below the surface of the molten mass by pressure, suspension, or mechanical means, so that the difference in gravity between the carbon and molten substances does not militate to separate the substances from contact during process of reduction. Such difference in gravity otherwise would tend to cause the lighter carbon to float upon the surface of the molten substances.

Instead of employing as a solvent chemical bath fused lithium and calcium oxids, or what may be termed "lithium calcate" or substance containing the same, as herein set forth, I can employ fused lithium-glucinum oxids or lithium glucinate or substance containing the same in cases where particular lightness or low specific gravity of the bath is desired, or I can mix or combine any oxid or oxids or compositions thereof or employ any oxy compound of metals in a fused condition as a chemical bath in which the reduction of metal is performed so long as the said fused bath consists of an oxy compound or compounds of metal having greater affinity for oxygen than the metal desired, and the direct or electrolytic current is so regulated as to decompose or liberate metal or metals therefrom having less affinity for oxygen than the metal of the fused bath without departing from the spirit of my invention.

In the reduction of refractory metal oxids, such as aluminium oxid dissolved in a molten bath of chemicals, as hereinbefore set forth, the refractory metal oxid is dissolved by the solvent action of the fused chemical solvent, and its liquefaction below its normal melting-point is accomplished by the direct solvent action of the chemical bath without expenditure of either heat or electrical energy to accomplish its fusion. The liquefaction of the refractory metal oxid is therefore accomplished by means other than the action of an electric current.

Having now described my invention, what I claim as new, and desire to secure by Letters Patent, is—

1. The process of reducing metals which consists in fusing a metal oxy compound, adding an oxy compound of metal having less affinity for oxygen, subjecting the mass to the action of an electric current capable of liberating the metal having less affinity for oxygen and replenishing the mass with an oxy compound of the metal liberated and separated as the fused bath is depleted thereof by reduction.

2. The process of reducing metals which consists in fusing and maintaining fusion of oxy compound of metal or metals by means other than a metal-yielding electric current, supplying thereto an oxy compound of a metal having less affinity for oxygen, subjecting the mass to the action of a current of electricity capable of liberating and yielding metal having less affinity for oxygen, and replenishing the mass with oxy compound of the metal reduced as the mass becomes depleted thereof by reduction.

3. The process of reducing aluminium which consists in exposing while in a fused state, a substance containing aluminium and metal having greater affinity for oxygen than aluminium, the said metals being combined with oxygen, to the action of an electrolytic current capable of liberating aluminium therefrom.

4. The process of reducing aluminium which consists in subjecting an oxy compound of aluminium, while liquefied in a bath of oxy compound of metal having greater affinity for oxygen than aluminium, to the action of an electrolytic current capable of liberating aluminium therefrom.

5. The process of reducing aluminium which consists in fusing an oxy compound of metal having greater affinity for oxygen than aluminium, adding thereto aluminium oxid and subjecting the mass to the action of an electrolytic current capable of liberating the aluminium and replenishing the bath with aluminium oxid from time to time as the aluminium is liberated and the bath becomes depleted thereof by reduction.

6. The process of reducing metals which consists in fusing a metal oxid or oxids, adding thereto an oxid of a metal having less affinity for oxygen, subjecting the mass to the action of an electrolytic current capable of liberating the metal having less affinity for oxygen, and replenishing the mass with oxid of the metal liberated and separated as the fused bath is depleted thereof by reduction.

7. The process of reducing aluminium which consists in supplying aluminium oxid to a fused bath of oxid of metal having greater affinity for oxygen and dissociating the aluminium oxid by electrolysis.

8. The process of producing aluminium which consists in liquefying aluminium oxid by the action of fused oxids having greater affinity for oxygen than aluminium and subjecting the said liquefied aluminium oxid to the action of an electrolytic current.

9. The process of reducing aluminium which consists in electrolyzing aluminium oxid while dissolved in a fused bath of oxids of metals having greater affinity for oxygen than aluminium.

10. The process of reducing aluminium which consists in supplying aluminium oxid to a fused bath of oxid having greater affinity for oxygen, and dissociating the aluminium oxid by electrolysis in the presence of an anode capable of combining with the oxygen liberated.

11. The process of reducing aluminium which consists in fusing a bath of metal oxid, adding thereto aluminium oxid, subjecting the mass to the action of an electrolytic current capable of liberating aluminium and replenishing the mass with aluminium oxid from time to time as the fused bath becomes depleted thereof by reduction.

12. The process of reducing aluminium which consists in fusing lithium and calcium oxids, adding thereto aluminium oxid, subjecting the mass to the action of an electrolytic current capable of liberating aluminium and replenishing the fused oxids with more aluminium oxid from time to time as depleted thereof by reduction.

13. The process of reducing aluminium which consists in liquefying a substance containing aluminium by the action of a molten chemical substance containing an oxy compound of lithium, and subjecting the molten substance to the action of an electrolytic current capable of liberating aluminium therefrom.

14. The process of reducing aluminium which consists in liquefying aluminium oxid by the action of a molten chemical substance containing an oxy compound of lithium and subjecting the molten substance to the action of an electrolytic current capable of liberating aluminium therefrom.

15. The process of reducing aluminium which consists in liquefying a substance containing aluminium by the action of a molten chemical substance containing lithium oxid, and subjecting the molten substance to the action of an electrolytic current capable of liberating aluminium therefrom.

16. The process of reducing aluminium which consists in liquefying aluminium oxid by the action of a molten chemical substance containing lithium oxid and subjecting the molten substance to the action of an electrolytic current capable of liberating aluminium therefrom.

17. The process of reducing metals which consists in maintaining fusion of substances containing metal by the action of a non-metal-yielding electric current between electrodes while liberating the metal therefrom by the action of a metal-yielding electric current.

18. The process of reducing metals which consists in exposing substances containing the same to the combined action of an alternating and direct electric current passed through the substance between electrodes.

19. The process of reducing metals which consists in fusing substances by passing through the same between electrodes, an electric current incapable of yielding metal independently and simultaneously liberating metal from the fused substance by the action of a metal-yielding or direct electric current.

20. The process of reducing metals which consists in fusing and maintaining fusion of substances containing metal by the action of an alternating electric current passing through the same between electrodes and liberating metal therefrom by the action of a direct or electrolytic current.

21. The process of reducing metals which consists in fusing substances capable of dissolving metal oxids while in the state of fusion, by passing through the same between electrodes an electric current incapable of yielding metal independently, adding thereto and dissolving therein an oxid of the metal desired to be reduced, and electrolytically decomposing the dissolved metal oxid below the normal melting-point of the oxid *per se* by action of a separate or metal-yielding current.

In witness thereof I hereunto set my hand and seal in the presence of two witnesses.

HENRY SPENCER BLACKMORE. [L. S.]

Witnesses:
C. C. WRIGHT,
H. N. JENKINS.